United States Patent
Lu et al.

(10) Patent No.: US 11,057,904 B2
(45) Date of Patent: Jul. 6, 2021

(54) PRIORITIZATION OF MOBILE TERMINATING RADIO RESOURCE CONTROL CONNECTIONS

(71) Applicant: T-Mobile USA, Inc., Bellevue, WA (US)

(72) Inventors: Kun Lu, Bellevue, WA (US); Neng-Tsann Ueng, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 123 days.

(21) Appl. No.: 15/833,933

(22) Filed: Dec. 6, 2017

(65) Prior Publication Data
US 2019/0174394 A1   Jun. 6, 2019

(51) Int. Cl.
| H04W 48/06 | (2009.01) |
| H04W 72/04 | (2009.01) |
| H04W 68/02 | (2009.01) |
| H04W 76/10 | (2018.01) |

(Continued)

(52) U.S. Cl.
CPC ....... *H04W 72/10* (2013.01); *H04W 28/0231* (2013.01); *H04W 28/0268* (2013.01); *H04W 28/0289* (2013.01); *H04W 48/06* (2013.01); *H04W 68/02* (2013.01); *H04W 72/048* (2013.01); *H04W 72/0413* (2013.01); *H04W 76/10* (2018.02)

(58) Field of Classification Search
CPC ..... H04W 48/06; H04W 76/10; H04W 68/02; H04W 72/10
See application file for complete search history.

(56) References Cited

U.S. PATENT DOCUMENTS

| 2004/0102199 A1* | 5/2004 | Haumont | H04W 68/12 455/458 |
| 2008/0014969 A1* | 1/2008 | Laroia | H04W 68/00 455/458 |

(Continued)

OTHER PUBLICATIONS

3GPP TS 36331 v14.2.2, "3rd Generation Partnership Project; Technical Specification Group Radio Access Network; Evolving Universal Terrestrial Radio Access (E-UTRA); Radio Resource Control (RRC); Protocol Specification (Release 14)", Apr. 2017, 722 pgs.

(Continued)

*Primary Examiner* — Omer S Mian
(74) *Attorney, Agent, or Firm* — Lee & Hayes, P.C.

(57) ABSTRACT

A connection between mobile terminating (MT) user equipment (UE) and a base station can be established by receiving a paging message at the MT UE from the base station that includes a page reason indicator indicating that the MT UE is being paged for a voice call, and, at least partially in response to receipt of the paging message, sending a Radio Resource Control (RRC) Connection Request message from the MT UE to the base station that includes an establishment cause indicating that the MT UE is requesting a connection with the base station for the voice call. The establishment cause indicating that the MT UE is requesting a connection for a voice call can allow the base station to prioritize the MT UE's RRC Connection Request message over RRC Connection Request messages from other UEs in congested conditions.

20 Claims, 8 Drawing Sheets

(51) Int. Cl.
*H04W 28/02* (2009.01)
*H04W 72/10* (2009.01)

(56) References Cited

U.S. PATENT DOCUMENTS

| | | | |
|---|---|---|---|
| 2013/0115977 A1* | 5/2013 | Chandramouli | H04W 68/02 |
| | | | 455/458 |
| 2014/0378155 A1 | 12/2014 | Yu | |
| 2015/0071249 A1* | 3/2015 | Hu | H04W 36/0022 |
| | | | 370/331 |
| 2016/0100344 A1 | 4/2016 | Kodali | |
| 2016/0219644 A1 | 7/2016 | Zhao et al. | |
| 2016/0255544 A1* | 9/2016 | Watfa | H04W 36/0022 |
| | | | 370/331 |
| 2017/0094565 A1 | 3/2017 | Sharma et al. | |
| 2017/0164325 A1* | 6/2017 | Ekemark | H04W 76/18 |
| 2018/0220327 A1* | 8/2018 | Karampatsis | H04W 28/0252 |
| 2019/0335531 A1* | 10/2019 | Wang | H04W 76/27 |

OTHER PUBLICATIONS

PCT Search Report and Written Opinion dated Mar. 8, 2019 for PCT Application No. PCT/US18/63092, 14 pages.

\* cited by examiner

Enhanced Paging Message 302

Page Reason Indicator 304

FIG. 3

RRC Connection Request 110

Establishment Cause 114: MT Voice Call

PRIORITIZATION OF MOBILE TERMINATING RADIO RESOURCE CONTROL CONNECTIONS

BACKGROUND

In a telecommunication network, user equipment (UE) and base stations can exchange Radio Resource Control (RRC) messages to establish connections through which communications can be passed to and from the UEs. For example, a UE can exchange RRC messages with an eNode B (eNB) in a Long-Term Evolution (LTE) network in order to establish a connection with the eNB. The UE can then send or receive data for voice calls, video calls, text messages, pictures, data, or other types of communications via its connection with the eNB.

Existing systems prioritize connections between mobile originating (MO) UEs and base stations for voice calls over connections for data transfers and other types of communications. However, such existing systems do not similarly prioritize connections between mobile terminating (MT) UEs and base stations that would be used to receive such voice calls. Accordingly, when an MO UE places a call to an MT UE in congested conditions, the MT UE's connection to a base station to answer the voice call can be denied in favor of a connection to another UE even if the MO UE's connection was prioritized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 depicts an enhanced paging message that includes a page reason indicator.

FIG. 4 depicts an example of an RRC Connection Request message in which an Establishment Cause is identified as a Mobile Terminating (MT) voice call.

DETAILED DESCRIPTION

Introduction

Radio Resource Control (RRC) messages can be used to set up connections between user equipment (UE) and base stations in a telecommunication network. For example, a UE can send an RRC Connection Request message to a base station, and if the base station can handle a new connection it can return an RRC Connection Setup message, after which the UE can establish the connection. Both Mobile Originating (MO) UEs that initiate calls and Mobile Terminating (MT) UEs that receive calls can use RRC messages to set up their own connections with the same or different base stations.

RRC Connection Request messages can include an Establishment Cause that identifies the purpose of the connection requested by the UE, such as if the connection is for an emergency call, a voice call, a data transfer, or another type of communication. For example, 3GPP TS 36.331 defines enumerated values for an EstablishmentCause field of an RRC Connection Request message, including "emergency, highPriorityAccess, mt-Access, mo-Signalling, mo-Data, delayTolerantAccess-v1020, mo-VoiceCall-v1280, spare1."

In congested conditions in which a base station does not have sufficient resources to establish connections for all of the RRC Connection Request messages it receives, the base station can prioritize among the requested connections based on their Establishment Causes. For example, an MO UE can use "mo-VoiceCall-v1280" to indicate that it is requesting a connection for a voice call, and the base station can be set to prioritize voice calls over other types of connections.

However, there is no corresponding value for the Establishment Cause in 3GPP TS 36.331 to indicate that a MT UE is attempting to set up a connection to receive a voice call. In congested conditions, the lack of such an Establishment Cause can lead to voice calls failing, even when the MO UE's RRC Connection Request message is prioritized, as will be discussed further below with respect to FIG. 2.

This disclosure describes systems and processes through which an MT UE can determine that an MO UE is attempting to place a voice call to the MT UE, and in response include a prioritized Establishment Cause in its RRC Connection Request message that indicates it is requesting a connection to receive a voice call.

Example Environment

Figure 1:
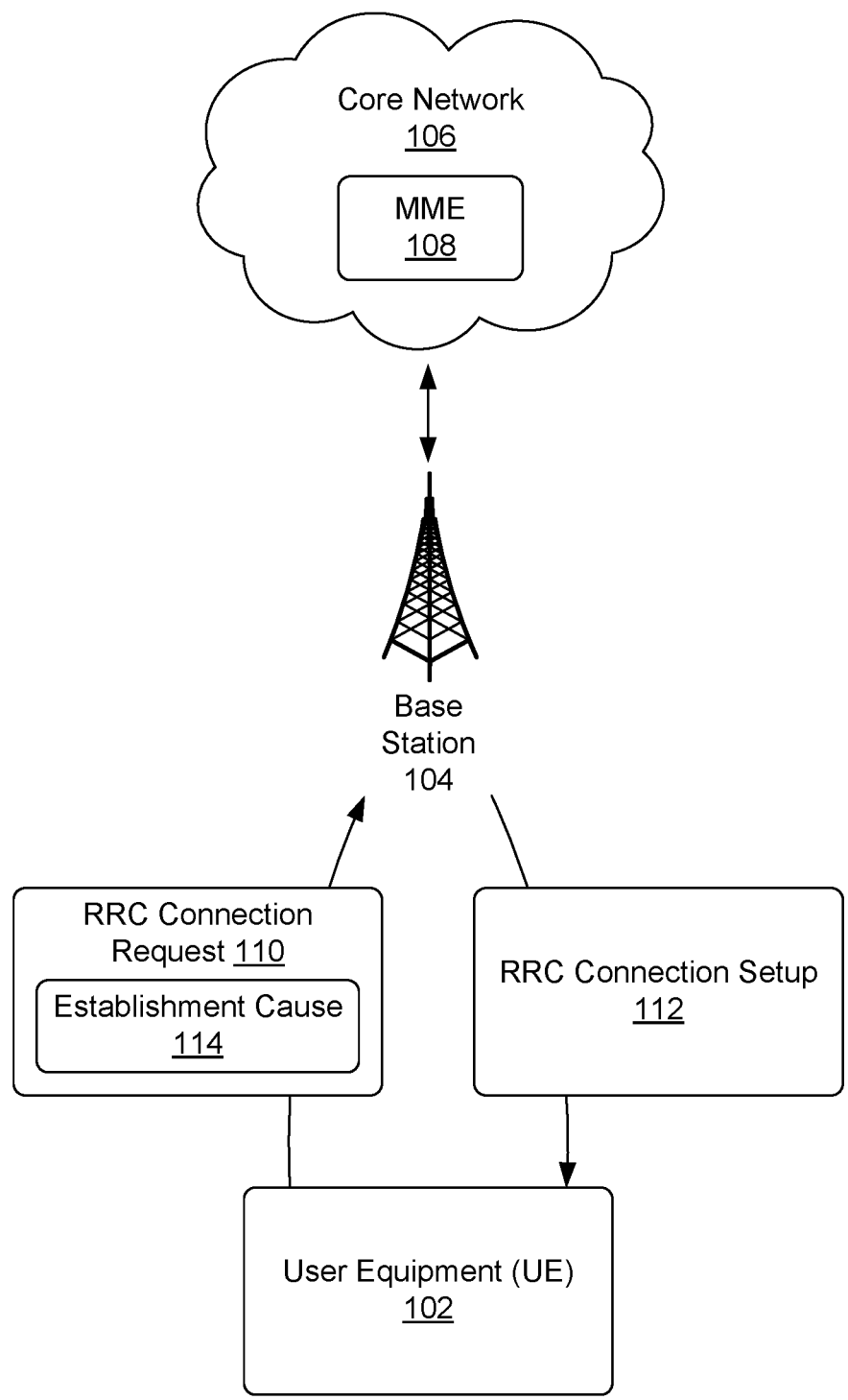
FIG. 1 depicts an exemplary environment in which user equipment (UE) can establish a connection with a base station of a telecommunication network.

FIG. 1 depicts an exemplary environment in which a UE 102 can establish a connection with a base station 104 of a telecommunication network. The base station 104 can be connected to a core network 106 that includes a Mobility Management Entity (MME) 108 or other control node. The UE 102 can connect to a base station 104 to send and/or receive data through the core network 106. For example, a UE 102 can establish a connection with a base station 104 to engage in a voice call with another UE 102, such as a Voice over LTE (VoLTE) call. Similarly, a UE 102 can establish a connection with a base station 104 to send or receive other types of data via the core network 106, such as downloading a file, streaming a video, or transmitting any other kind of data.

A UE 102 can be any device that wirelessly connects to a base station 104, such as a smart phone, a cellular phone, a personal digital assistant (PDA), a personal computer (PC), a laptop, a desktop, a workstation, a media player, a tablet, an electronic book device, a gaming device, a smart watch, or any other type of computing or communication device. An example UE 102 is illustrated in greater detail in FIG. 6 and is described in detail below with reference to that figure.

A UE 102 can be in one of many predefined RRC states. For example, when a UE 102 is not connected to a base station 104 to engage in a communication or data transfer session, the UE 102 can be in an RRC idle mode that uses a low amount of energy. However, when the UE 102 is in an RRC idle mode, it can periodically check for paging messages from the base station 104, as will be discussed further below. When the UE 102 is actively connected to a base station 104 to engage in a communication and/or data transfer session, the UE 102 can be in a different RRC mode that uses more energy.

A base station 104 can be a node or other access point that provides a connected UE 102 with access to the core network 106 through a wireless access technology, such as Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and/or WiFi® technology. For example, in an LTE network a base station 104 can be an eNode B (eNB). An example base station 104 is illustrated in greater detail in FIG. 7 and is described in detail below with reference to that figure.

The core network 106 can include the MME 108, as well as other components such as a Home Subscriber Server (HSS), Packet Data Network (PDN) Gateway (P-GW), Serving Gateway (S-GW), and Policy Control and Charging Rules Function (PCRF). A UE 102 can communicate via a base station 104 with both the MME 108 and an S-GW. An S-GW can in turn be connected to a P-GW, which connects the core network 106 to an external network such as the Internet. The MME 108 is a control node in the core network 106 that can send paging messages to UEs 102 as will be described below, but can also perform other functions including authenticating subscribers in conjunction with the HSS, establishing default and dedicated bearers for traffic to and from UEs 102, and choosing S-GWs for UEs 102.

As shown in FIG. 1, a UE 102 can establish a connection with a base station 104 by sending an RRC Connection Request message 110 to the base station 104. In some examples the UE 102 can send the RRC Connection Request message 110 to the base station 104 over a Physical Uplink Shared Channel (PUSCH).

If the base station 104 can handle a new connection, it can return an RRC Connection Setup message 112 to the UE 102 that includes information allowing the UE 102 to establish the requested connection with the base station 104. However, if the base station 104 cannot handle the new connection, it can respond with an RRC Connection Reject message, and the attempted connection can fail. In some examples, the base station 104 can send RRC Connection Setup messages 112 and/or RRC Connection Reject messages over a Physical Downlink Shared Channel (PDSCH).

An RRC Connection Request message 110 can include an indicator of an Establishment Cause 114 that identifies the intended purpose of the connection that the UE 102 is attempting to set up. For example, 3GPP TS 36.331 specifies "emergency, highPriorityAccess, mt-Access, mo-Signalling, mo-Data, delayTolerantAccess-v1020, mo-VoiceCall-v1280, spare1" as possible values for an EstablishmentCause field in an RRC Connection Request message 110. As will be discussed further below, although 3GPP TS 36.331 specifies "mo-VoiceCall-v1280" as a value for the EstablishmentCause field to indicate that a Mobile Originating (MO) UE 102 is requesting a connection to place a voice call, 3GPP TS 36.331 does not specify a corresponding value for the EstablishmentCause field to indicate that a Mobile Terminating (MT) UE 102 is requesting a connection to receive a voice call. This lack of an Establishment Cause value indicating that an MT UE 102 is requesting a connection to receive a voice call can lead to failed calls during congested conditions at a base station 104.

Figure 2:
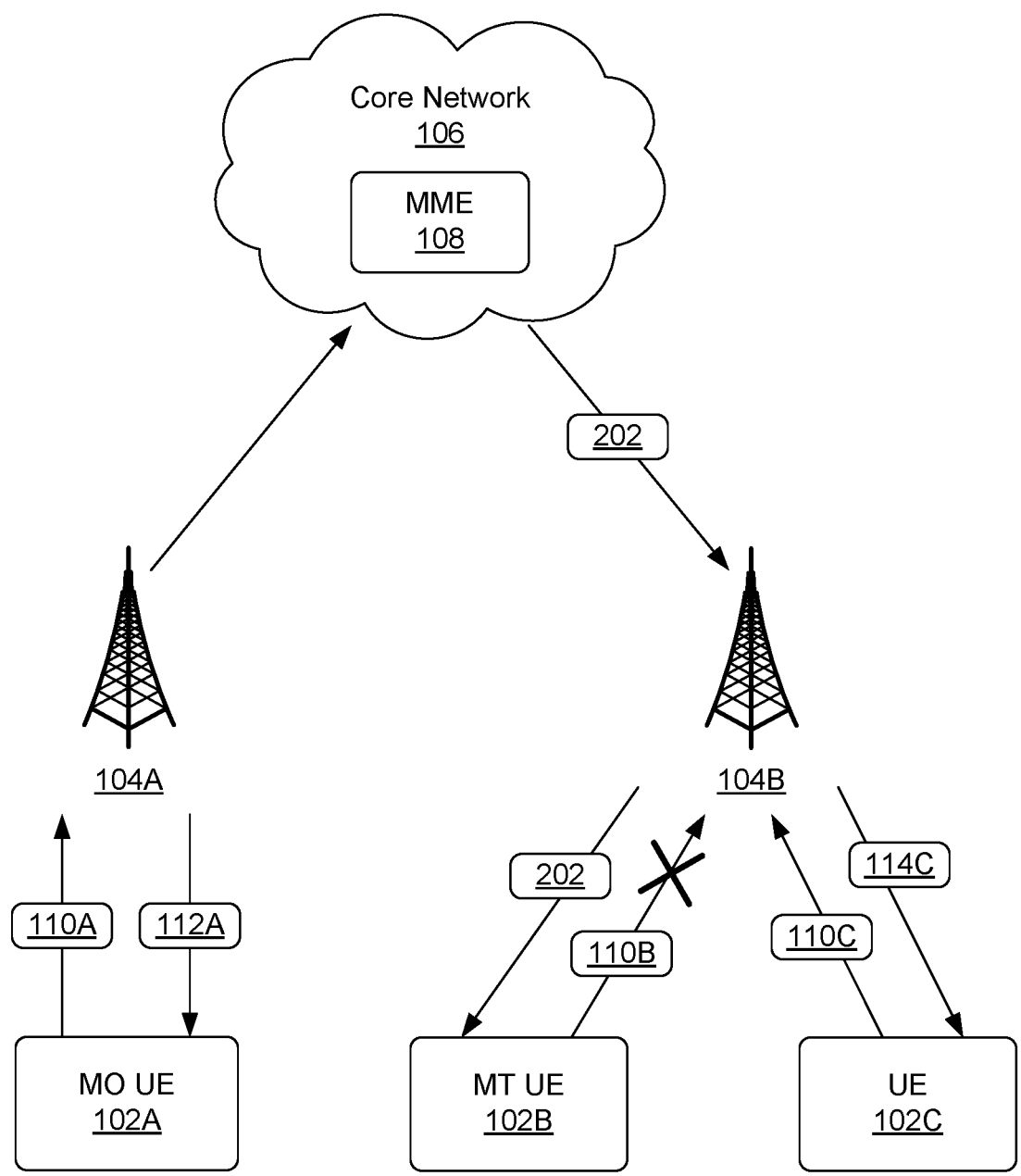
FIG. 2 depicts an example in which a voice call between an MO UE and an MT UE can fail when existing solutions are used, due to congestion at a base station.

FIG. 2 depicts an example in which a voice call between an MO UE 102A and an MT UE 102B can fail when existing solutions are used, due to congestion at a base station 104.

When the MO UE 102A attempts to place a voice call to the MT UE 102B, the MO UE 102A first establishes a connection with base station 104A. The MO UE 102A can send the base station 104A an RRC Connection Request message 110A that includes an Establishment Cause 114 indicating that the MO UE 102A is requesting a connection for a voice call. By way of a non-limiting example, the MO UE 102A can include a value of "mo-VoiceCall-v1280" in an EstablishmentCause field within the RRC Connection Request message 110, as defined by 3GPP TS 36.331, to signify that the requested connection will be used for a voice call. The base station 104A can be set to prioritize RRC Connection Request messages 110 with an Establishment Cause 114 indicating that an MO UE 102 is requesting a connection for a voice call over RRC Connection Request messages 110 for data transfer connections and other types of connections that have been assigned a lower priority than voice calls. Accordingly, the base station 104A can be more likely to accept the RRC Connection Request message 110A even in congested conditions, due to its Establishment Cause 114 indicating that the MO UE 102A is requesting a connection for a voice call.

Upon accepting the RRC Connection Request message 110A, the base station 104A can return an RRC Connection Setup message 112A to the MO UE 102A, which includes information allowing the MO UE 102A to establish the requested connection with the base station 104A. After the connection is established, the MO UE 102A can inform, via the base station 104A, the MME 108 and/or any other component of the core network 106 that it is attempting to place a voice call to the MT UE 102B.

The MME 108 and/or other components of the core network 106 can send a paging message 202 to one or more base stations 104 that are expected to be within range of the MT UE 102B. By way of a non-limiting example, the MME 108 or other network components can track an expected location and/or a last known location of the MT UE 102B, and can send a paging message 202 to base stations 104 near those locations. The paging message 202 can include a unique identifier of the paged MT UE 102B, such as an International Mobile Subscriber Identity (IMSI) number.

A base station 104B that receives a paging message 202 from the MME 108 can broadcast or otherwise transmit its own version of the paging message 202. In some examples the base station 104B can transmit the paging message 202 using a PDSCH channel.

In some examples the base station 104B can transmit an aggregated paging message 202 that includes unique identifiers for multiple UEs 102 that are being paged. Although a UE 102 can be in an RRC idle mode if it does not have an active connection with a base station 104, it can periodically check for paging messages 202 from base stations 104 and check if those paging messages 202 include its unique identifier. If a UE 102 receives a paging message 202 that includes the UE's unique identifier, the UE 102 can attempt to set up a connection with the base station 104 that transmitted the paging message 202.

However, in existing systems, although a paging message 202 can inform one or more UEs 102 that they should attempt to establish a connection with a base station 104, the paging message 202 does not identify the purpose of that connection. Accordingly, a paging message 202 does not indicate whether the telecommunication network is paging a UE 102 regarding an incoming voice call, a data transfer, or other type of communication. In some examples a paging message 202 may identify a priority level, however paging messages 202 sent for voice calls, for data transfers, or for other types of communications might be given the same priority level, thereby causing UEs 102 to treat them the same even if one was sent in response to an attempted voice call from a MO UE 102.

In the example shown in FIG. 2, when the MT UE 102B receives a paging message 202 from the base station 104B that includes the MT UE's unique identifier, the MT UE 102B can send its own RRC Connection Request message 110B to that base station 104B. In some examples the base station 104B can be the same as the base station 104A, while in other examples the base station 104B can be different than the base station 104A.

Because the paging message 202 does not indicate why the MT UE 102B was paged, the MT UE 102B can include a generic Establishment Cause 114 in its RRC Connection Request message 110B. For example, 3GPP TS 36.331 defines "mt-Access" as an enumerated value for the EstablishmentCause field that an MT UE 102B can use when responding to a paging message 202.

However, another UE 102C may also send its own RRC Connection Request message 110C to the same base station 104B at substantially the same time. Although UE 102C might have been paged to set up a connection for a data transfer, it may also have received a paging message 202 that does not indicate the reason for the page. UE 102C would accordingly also include a generic Establishment Cause 114 in its RRC Connection Request message 110C, such as "mt-Access." Because both RRC Connection Request messages 110 contain the same Establishment Cause 114 in this example, the base station 104B would have no reason to prioritize RRC Connection Request message 110B from MT UE 102B over the RRC Connection Request message 110C from UE 102C. Accordingly, if base station 104B is congested and does not have enough resources to set up connections for both MT UE 102B and UE 102C, it might reject the connection for MT UE 102B even though MT UE 102B would have set up a connection to receive a voice call that is a higher priority than the data transfer to UE 102C.

FIG. 3 depicts an enhanced paging message 302 that includes a page reason indicator 304. Unlike the paging message 202, an enhanced paging message 302 can have a page reason indicator 304 that identifies why an MME 108 and/or base station 104 sent the enhanced paging message 302 to a UE 102. When an MT UE 102 is being paged for a voice call, the page reason indicator 304 can identify that the MT UE 102 is being paged for a voice call. In various examples, the page reason indicator 304 can be included in a header or data field of the enhanced paging message 302, or can be a flag or control bit set to a particular value to indicate that the MT UE 102 is being paged for a voice call. The page reason indicator 304 can be linked in the enhanced paging message 302 to a unique identifier of the MT UE 102 being paged.

In some examples the page reason indicator 304 can be included or used when a UE 102 is being paged to set up a connection to receive a voice call, while other types of connections are not signified with a page reason indicator 304. In other examples the page reason indicator 304 can also be used to signify that a UE 102 is being paged to set up a connection for a data transfer, video call, or any other type of communication.

FIG. 4 depicts an example of an RRC Connection Request message 110 in which the Establishment Cause 114 is for an MT voice call. An MT UE 102 that receives an enhanced paging message 302 with a page reason indicator 304 specifying a voice call can include an Establishment Cause 114 associated with an MT voice call in its RRC Connection Request message 110. In some examples, "spare 1" in the enumerated values defined by 3GPP TS 36.331 for the EstablishmentCause field can be replaced with a value such as "mt-VoiceCall." Accordingly, in these examples, an MT UE 102 that receives an enhanced paging message 302 with a page reason indicator 304 specifying a voice call can include "mt-VoiceCall" as an Establishment Cause 114 in its RRC Connection Request message 110. In other examples, an MT UE 102 can use any other value or code as an Establishment Cause 114 to indicate that it is requesting a connection for a voice call.

Figure 5:
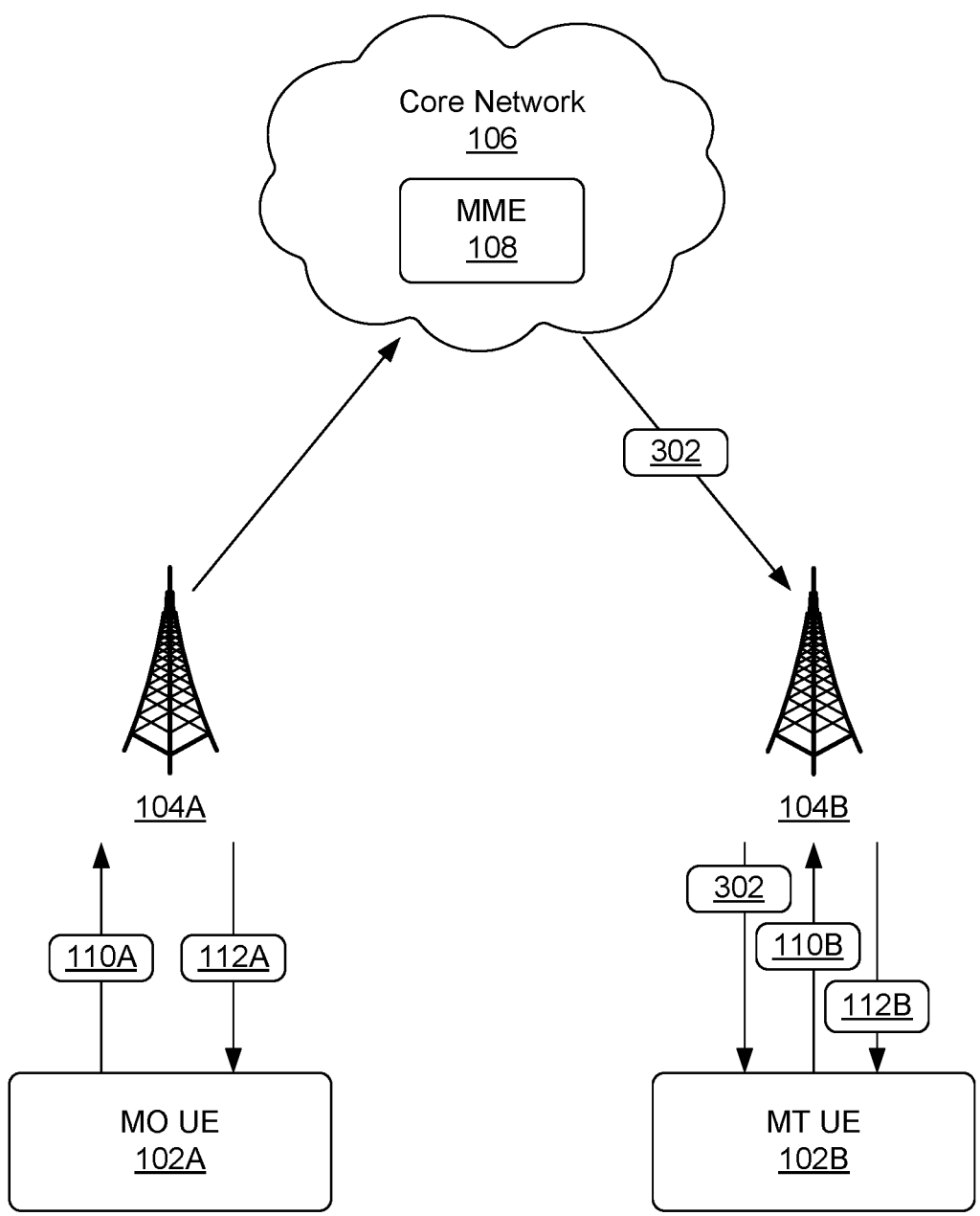
FIG. 5 depicts an example in which a voice call between an MO UE and an MT UE can be established despite congestion at a base station, due to the use of an enhanced paging message and an RRC Connection Request message with an Establishment Cause for an MT voice call.

FIG. 5 depicts an example in which a voice call between an MO UE 102A and an MT UE 102B can be established despite congestion at a base station 104, due to the use of an enhanced paging message 302 and an RRC Connection Request message 110 with an Establishment Cause 114 for an MT voice call.

As with FIG. 2, when the MO UE 102A attempts to place the voice call to the MT UE 102B, the MO UE 102A first establishes a connection with base station 104A by sending an RRC Connection Request message 110A with an Establishment Cause 114 indicating that the MO UE 102A is requesting a connection for a voice call, such as "mo-VoiceCall-v1280." The base station 104A can be set to prioritize MO voice calls, and as such can accept the RRC Connection Request message 110A even in congested conditions.

After the MO UE 102A successfully connects to the base station 104A, the MME 108 can send an enhanced paging message 302 to base station 104B. The enhanced paging message 302 can include a page reason indicator 304 specifying that MT UE 102B is being paged in order to set up a voice call. Base station 104B can in turn transmit its own version of the enhanced paging message 302. In some examples the base station 104B can transmit the enhanced paging message 302 using a PDSCH channel.

The MT UE 102B can receive the enhanced paging message 302 and determines that it includes a unique identifier for the MT UE 102B. The MT UE 102B can also review the page reason indicator 304 and determine that it is being paged in order to set up a connection through which it can receive a voice call. Based on that determination, the MT UE 102B can send its own RRC Connection Request message 110B to the base station 104B. The MT UE's RRC Connection Request message 110B can include a value for the Establishment Cause 114 that indicates that the MT UE 102B is requesting a connection for a voice call.

As with base station 104A, the base station 104B can be set to prioritize RRC Connection Request messages 110 with Establishment Causes 114 associated with voice calls over Establishment Causes 114 associated with data transfers or other types of connections that have been assigned a lower priority. For example, "mt-VoiceCall" or other Establishment Cause 114 values associated with MT voice calls can be prioritized over "mt-Access" or other generic Establishment Cause 114 values that might be used for data transfer connections.

Accordingly, the inclusion of an Establishment Cause 114 in the RRC Connection Request message 110B that indicates that the MT UE 102B is requesting a connection for a voice call can lead to the base station 104B accepting the RRC Connection Request message 110B despite congested conditions. For example, if the UE 102C shown in FIG. 2 had sent an RRC Connection Request message 110C with "mt-Access" in its EstablishmentCause field while MT UE 102B sent an RRC Connection Request message 110B with "mt-VoiceCall" in its EstablishmentCause field, the base station 104B can prioritize RRC Connection Request message 110B if it is congested. The base station 104B can accordingly send an RRC Connection Setup message 112 to MT UE 102B to set up that connection, but send an RRC Connection Reject message to the UE 102C.

Example Architecture

Figure 6:
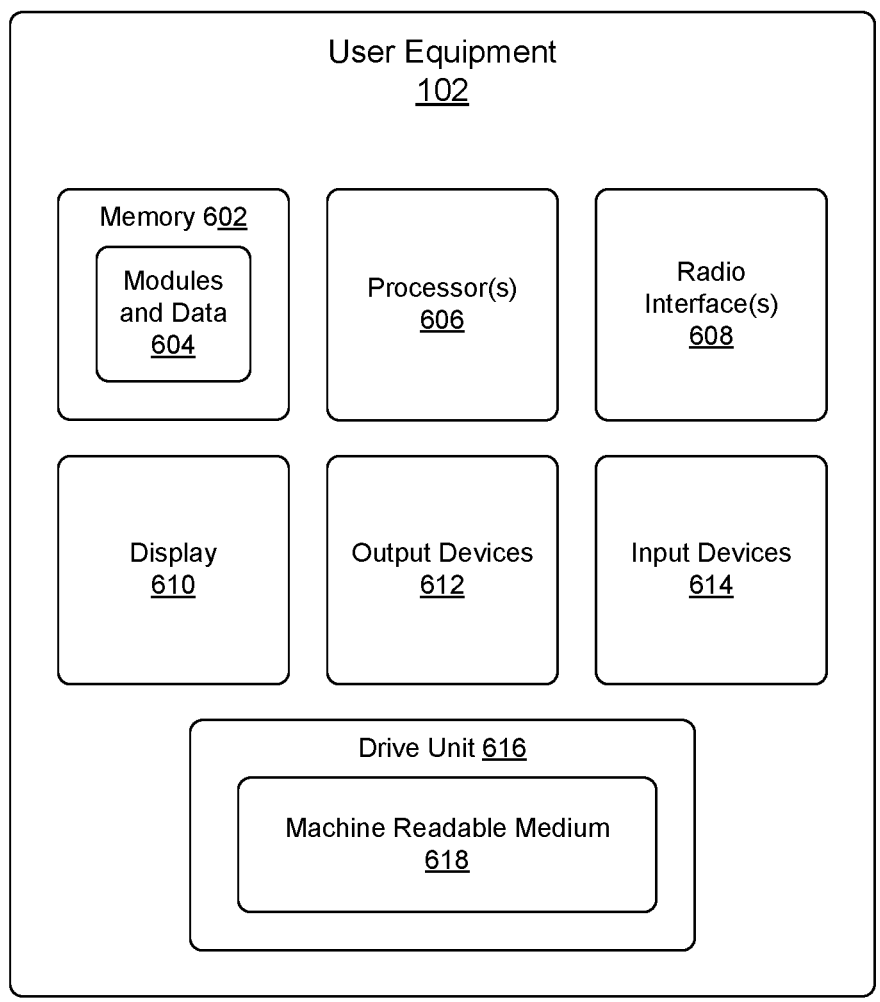
FIG. 6 depicts an example system architecture for a UE.

FIG. 6 depicts an example system architecture for a UE 102, in accordance with various examples. As shown, a UE 102 can include a memory 602 that stores modules and data 604, processor(s) 606, radio interfaces 608, a display 610, output devices 612, input devices 614, and/or a drive unit 616 including a machine readable medium 618.

In various examples, memory 602 can include system memory, which may be volatile (such as RAM), non-volatile (such as ROM, flash memory, etc.) or some combination of the two. Memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

In some examples memory 602 can also include a SIM (subscriber identity module) card, which is a removable memory card used to identify a user of the UE 102 to a telecommunication network.

The modules and data 604 can be utilized by the UE 102 to perform or enable performing any action taken by the UE 102. The modules and data 604 can include a UE platform and applications, and data utilized by the platform and applications.

In various examples, the processor(s) 606 can be a central processing unit (CPU), a graphics processing unit (GPU), or both CPU and GPU, or any other type of processing unit. Each of the one or more processor(s) 606 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 606 may also be responsible for executing all computer applications stored in the memory 602, which can be associated with common types of volatile (RAM) and/or nonvolatile (ROM) memory.

The radio interfaces 608 can include transceivers, modems, interfaces, antennas, and/or other components that perform or assist in exchanging radio frequency (RF) communications with a base station 104. In other examples a processor 606, other modules and data 604, and/or other components of the UE 102 can perform or assist in transmitting and/or receiving data, and/or pre-processing or post-processing of such data.

The display 610 can be a liquid crystal display or any other type of display commonly used in UEs 102. For example, display 610 may be a touch-sensitive display screen, and can then also act as an input device or keypad, such as for providing a soft-key keyboard, navigation buttons, or any other type of input.

The output devices 612 can include any sort of output devices known in the art, such as a display 610, speakers, a vibrating mechanism, and/or a tactile feedback mechanism. Output devices 612 can also include ports for one or more peripheral devices, such as headphones, peripheral speakers, and/or a peripheral display.

The input devices 614 can include any sort of input devices known in the art. For example, input devices 614 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 606, and/or radio interface(s) 608 during execution thereof by the UE 102. The memory 602 and the processor(s) 606 also can constitute machine readable media 622.

Figure 7:
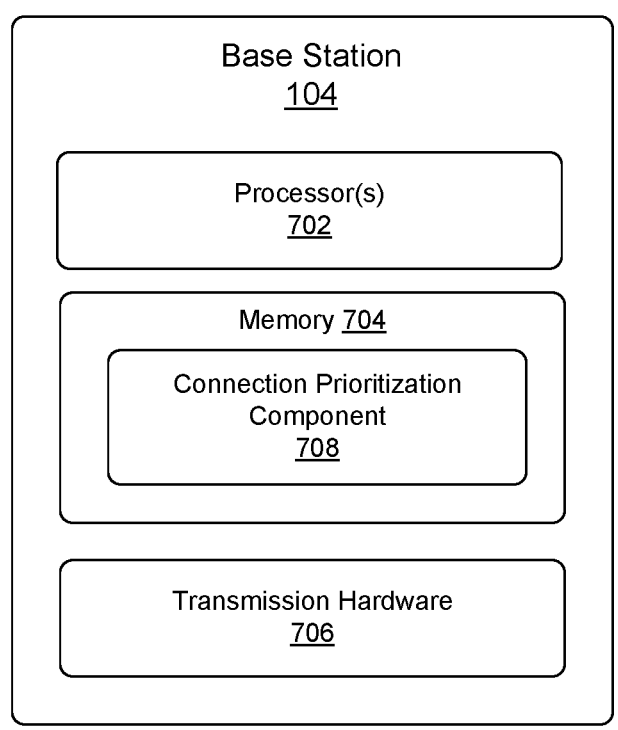
FIG. 7 depicts an example system architecture for a base station.

FIG. 7 depicts an example system architecture for a base station 104, in accordance with various examples. As shown, a base station 104 can include processor(s) 702, memory 704, and transmission hardware 706.

In various examples, the processor(s) 702 can be a central processing unit (CPU), a graphics processing unit (GPU), both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in the memory 704, which can be associated with common types of volatile (RAM) and/or nonvolatile (ROM) memory.

In various examples, memory 704 can include system memory, which may be volatile (such as RAM), non-volatile (such as ROM, flash memory, etc.) or some combination of the two. The memory 704 can also include additional data storage devices (removable and/or non-removable) such as, for example, magnetic disks, optical disks, or tape. Memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The transmission hardware 706 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, transmit data, and monitor the connections. For example, in an LTE network, the transmission hardware 706 can establish and manage connections with one or more UEs 102. The transmission hardware 706 can handle transmissions and protocol exchanges on the baseband, such as a physical LTE connection, as well as the physical (PHY) and media access control (MAC) layers of a protocol stack.

The memory 704 can include data and/or computer-executable instructions for a connection prioritization component 708. In situations in which the base station 104 is congested and receives more RRC Connection Request messages 110 than it can accept, the connection prioritization component 708 can determine which of those RRC Connection Request messages 110 to accept based on the Establishment Causes 114 in the RRC Connection Request messages 110. For example, if the transmission hardware 706 is already engaged in multiple connections with UEs 102 and does not have the resources to establish new connections for each new RRC Connection Request message 110 received by the base station 104, the connection prioritization component 708 can determine which of them should be accepted and which should be rejected.

The connection prioritization component 708 can be configured with a prioritized list of Establishment Causes 114. As such, the connection prioritization component 708 can accept RRC Connection Request messages 110 with Establishment Causes 114 that are designated in the list as being higher priority than Establishment Causes 114 in other RRC Connection Request messages 110. For example, the prioritized list can specify that emergency calls are given the highest priority, voice calls from MO UEs 102 and/or MT UEs 102 are given the next highest priority, and other types of connections are given the lowest priority. Accordingly, when a base station 104 is congested and receives an RRC Connection Request message 110 with an Establishment Cause 114 for an MT voice call, such as "mt-VoiceCall," that RRC Connection Request message 110 can be accepted by the connection prioritization component 708 over another RRC Connection Request message 110 with an Establishment Cause 114 identifying generic MT access, such as "mt-Access."

Example Operations

Figure 8:
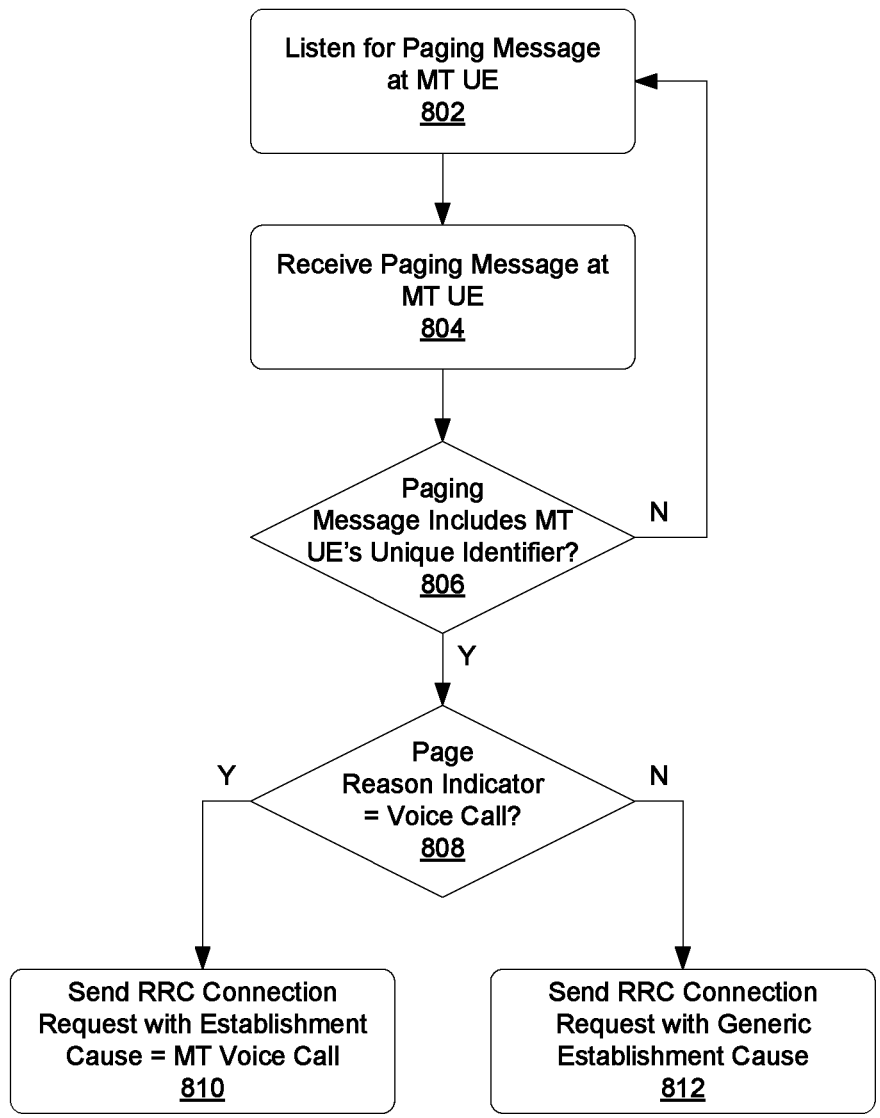
FIG. 8 depicts a flow chart of a method for sending an RRC Connection Request message from an MT UE.

FIG. 8 depicts a flow chart of a method for sending an RRC Connection Request message 110 from an MT UE 102.

At block 802, the MT UE 102 can listen for a paging message from a base station 104, such as the paging message 202 or enhanced paging message 302 described above. The MT UE 102 can be in a low-power RRC idle mode, but periodically check for paging messages transmitted by base stations 104.

The MT UE 102 can receive a paging message from a base station 104 at block 804. At block 806, the MT UE 102 can determine whether the paging message includes a unique identifier for the MT UE 102, such as the MT UE's IMSI number. If it does not, the MT UE 102 can return to block 802 to continue listening for paging messages. However, if the paging message does include the MT UE's unique identifier, the MT UE 102 can move to block 808.

At block 808, the MT UE 102 can determine if the paging message includes a page reason indicator 304 that indicates that the MT UE 102 is being paged to set up a connection to receive a voice call. If it does, such as if the paging message is an enhanced paging message 302 with a page reason indicator 304 tied to the MT UE's unique identifier that indicates the MT UE 102 is being paged for a voice call, the MT UE 102 can move to block 810. However, if the paging message is a paging message 202 without a page reason indicator 304, or if it is an enhanced paging message 302 with a page reason indicator 304 that does not specify that the MT UE 102 is being paged for a voice call, the MT UE 102 can move to block 812.

At block 810, if the MT UE 102 determined that the paging message included a page reason indicator 304 for a voice call, the MT UE 102 can send an RRC Connection Request message 110 that includes an Establishment Cause 114 indicating that the MT UE 102 is requesting a connection for a voice call. For example, the MT UE 102 can include "mt-VoiceCall" or any other value specifying an MT voice call in an EstablishmentCause field of the RRC Connection Request message 110.

At block 812, if the MT UE 102 determined that the paging message did not include a page reason indicator 304 for a voice call, the MT UE 102 can send an RRC Connection Request message 110 that includes a generic Establishment Cause 114. For example, the MT UE 102 can include "mt-Access" or any other value in an EstablishmentCause field of the RRC Connection Request message 110 that does not specifically identify the reason for the requested connection.

As described above, the base station 104 can be set to prioritize RRC Connection Request message 110 with Establishment Causes 114 for MT voice calls. As such, in congested conditions the base station 104 can be more likely to accept an RRC Connection Request message 110 with an Establishment Cause 114 for an MT voice call, such as the RRC Connection Request message 110 sent during block 810, over an RRC Connection Request message 110 with an Establishment Cause 114 that is not specifically associated with an MT voice call, such as the RRC Connection Request message 110 sent during block 812.

Accordingly, if the MT UE 102 determines during block 808 that it is being paged to set up a voice call and includes a prioritized Establishment Cause 114 for MT voice calls in its RRC Connection Request message 110 during block 810, the MT UE 102 is more likely to be able to establish a connection with the base station 104 in congested conditions. As such, a voice call between an MO UE 102 and an MT UE 102 can be more likely to be connected despite the congestion at the base station 104.

Figure 9:
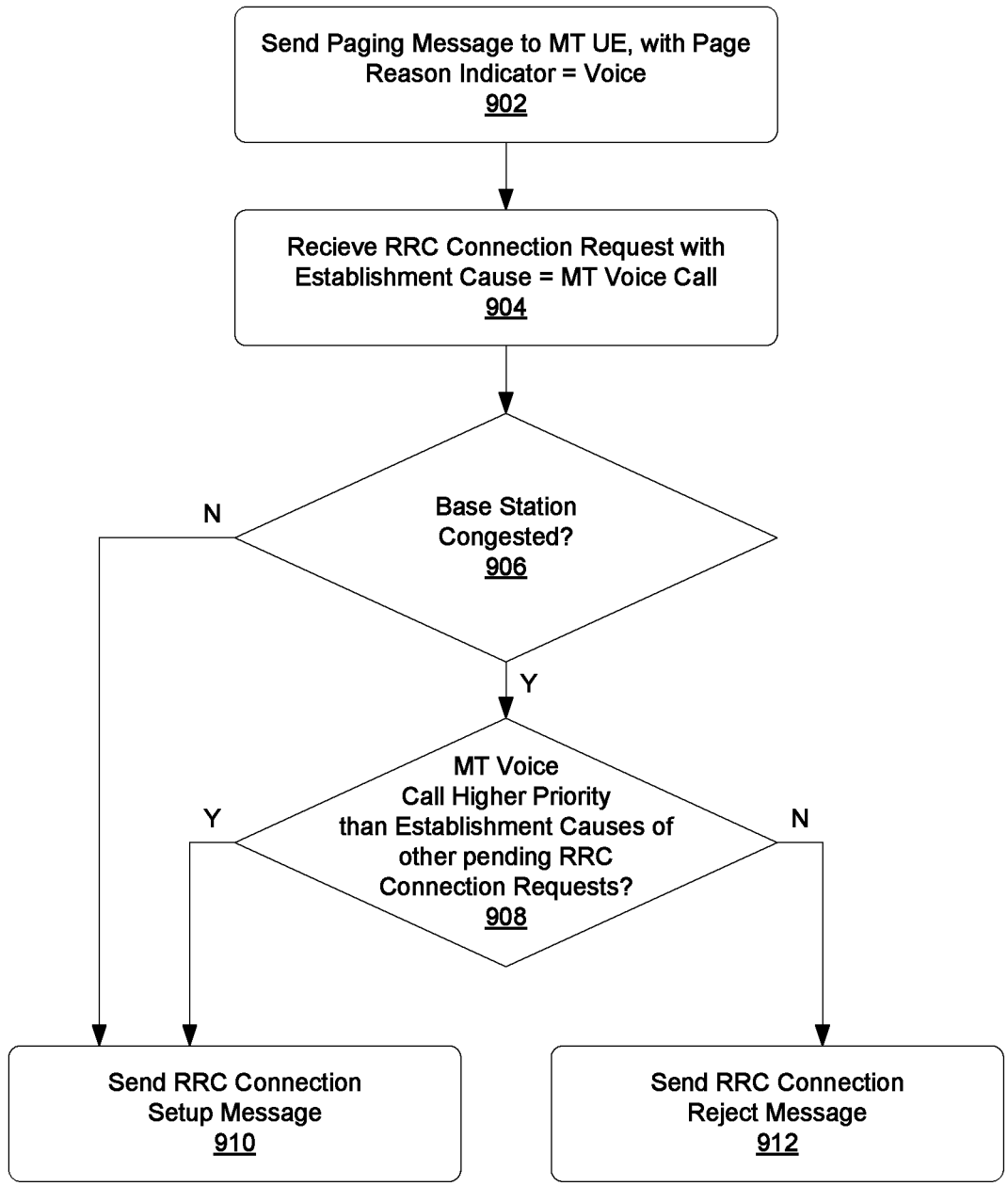
FIG. 9 depicts a flow chart of a method for prioritizing connections for MT voice calls at a base station.

FIG. 9 depicts a flow chart of a method for prioritizing connections for MT voice calls at a base station 104.

At block 902, the base station 104 can transmit an enhanced paging message 302 that includes a page reason identifier 304 specifying that a particular MT UE 102 is being paged for a voice call. The base station 104 can have received an enhanced paging message 302 from the MME 108 that also specifies that the MT UE 102 is being paged for a voice call, and in response can transmit its own enhanced paging message 302.

At block 904, the base station 104 can receive an RRC Connection Request message 110 from the MT UE 102 that includes an Establishment Cause 114 indicating that the MT UE 102 is requesting a connection for a voice call. For example, the RRC Connection Request message 110 can include "mt-VoiceCall" in an EstablishmentCause field, or some other value that indicates the Establishment Cause 114 is for an MT voice call.

At block 906, the base station 104 can determine if it is congested. The base station 104 can be experiencing congestion if it has a number of current connections to UEs 102 that is at or near the maximum number of possible connections, and cannot accept all of the pending RRC Connection Request messages 110 it has received. If the base station 104 is not congested, it can move to block 910 and return an RRC Connection Setup message 112 to the MT UE 102.

However, if the base station 104 is congested but has the resources to establish at least one new connection, at block 908 the base station 104 can prioritize among the Establishment Causes 114 in the pending RRC Connection Request messages 110. The base station 104 can have a prioritized list of Establishment Causes 114. The base station 104 can accept up to as many RRC Connection Request messages 110 as it has available connections, in an order based on the priorities of their Establishment Causes 114. In some examples, if two or more pending RRC Connection Request messages 110 have Establishment Causes 114 with the same priority, the base station 104 can break the tie by accepting them in random order, by accepting them based on the time at which they were sent or received, or by accepting them based on any other criteria.

Accordingly, at block 908 the base station 104 can compare the RRC Connection Request message 110 received during block 904 against other pending RRC Connection Request messages 110, based on its prioritized list of Establishment Causes 114. If, after accepting any RRC Connection Request messages 110 with higher priority Establishment Causes 114, the base station 104 still has resources for at least one new connection and other remaining pending RRC Connection Request messages 110 have lower priority Establishment Causes 114 than the MT voice call Establishment Cause 114, the base station 104 can accept the RRC Connection Request message 110 received at block 904 and return an RRC Connection Setup message 112 to the MT UE 102 at block 910. Following this, if the base station 104 does not still have resources to establish connections in response to one or more of the other remaining lower priority RRC Connection Request messages 110, it can return RRC Connection Reject messages to the UEs 102 that sent those messages due to the congestion.

However, if at block 908 the base station does not have sufficient resources for a connection to the MT UE 102, or if other pending RRC Connection Request messages 110 have higher priority Establishment Causes 114 than the MT voice call Establishment Cause 114, the base station 104 can reject the RRC Connection Request message 110 received at block 904 and return an RRC Connection Reject message to the MT UE 102 at block 912.

As noted above, at block 908 an Establishment Cause 114 for an MT voice call can be prioritized over other Establishment Causes 114, such as an Establishment Cause 114 for generic MT access that might ultimately be used for a data transfer or other communication with a lower priority than a voice call. Accordingly, when a base station 104 pages an MT UE 102 with an enhanced paging message 302 indicating that the MT UE 102 is being paged for a voice call and the MT UE 102 returns an RRC Connection Request message 110 with an Establishment Cause 114 for an MT voice call, the base station 104 can be more likely to accept that RRC Connection Request message 110 in congested conditions. As such, a voice call between an MO UE 102 and an MT UE 102 can be more likely to be connected despite the congestion at the base station 104.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of establishing a connection between mobile terminating user equipment and a base station, comprising:
receiving, from a base station, by a mobile terminating (MT) user equipment (UE) in an idle mode, an aggregated paging message that includes a header field, the header field comprising a page reason indicator and a unique identifier for the MT UE, the aggregated paging message associated with paging at least one other MT UE;
determining, by the MT UE, that the aggregated paging message includes the unique identifier for the MT UE;
determining, by the MT UE, that the aggregated paging message is indicating that the MT UE is being paged for a voice call from a mobile originating (MO) UE and is being prioritized by an originating base station connected to the MO UE based at least in part on the page reason indicator; and
at least partially in response to receipt of the aggregated paging message, sending, by the MT UE to the base station, a Radio Resource Control (RRC) Connection Request message including a value in an establishment cause field of the RRC Connection Request message, the value indicating to the base station that the MT UE is requesting a connection for the voice call and a purpose of the RRC Connection Request;
receiving from the base station, an RRC Connection Setup message in response to the value having a higher priority than a value in an RRC Connection Request from the at least one other MT UE, wherein the base station does not have sufficient resources to establish new connections for both the MT UE and the at least one other MT UE.

2. The method of claim 1, further comprising: establishing the connection between the MT UE and the base station in response to the RRC Connection Setup message; and using the connection to participate in the voice call between the MT UE and the MO UE.

3. The method of claim 2, wherein the base station is experiencing congestion and sent the RRC Connection Setup message based on a determination that the establishment cause in the RRC Connection Request message indicating that the MT UE is requesting the connection for the voice call has a higher priority than establishment causes in one or more other RRC Connection Request messages pending at the base station.

4. The method of claim 2, wherein the MO UE established a separate connection with the originating base station for the voice call using another RRC Connection Request message that included another establishment cause indicating that the MO UE requested the separate connection with the originating base station for the voice call, wherein the originating base station is the base station or another base station.

5. The method of claim 1, wherein the base station is an eNode B of an LTE network.

6. A method of establishing a connection between mobile terminating user equipment and a terminating base station, comprising:
   receiving, by the terminating base station, an indication that a first mobile terminating (MT) user equipment (UE) is being paged for a voice call from a mobile originating (MO) UE, wherein an originating base station gives the voice call a higher priority than non-voice communications;
   transmitting, by the terminating base station to the first MT UE, a paging message that includes a header field, the header field includes a page reason indicator indicating that the first MT UE is being paged for the voice call and a unique identifier for the first MT UE, the terminating base station including the header field in the paging message based on a determination that the first MT UE is being paged for the voice call;
   receiving, by the terminating base station from the first MT UE, a first Radio Resource Control (RRC) Connection Request message including a first establishment cause indicating that the first MT UE is requesting a connection with the terminating base station for the voice call;
   receiving, by the terminating base station from a second MT UE, a second RRC Connection Request message, the second RRC Connection Request message including a second establishment cause, the second establishment cause being generic; determining, by the terminating base station, that the transmission hardware of the terminating base station does not have sufficient resources to establish new connections for both the first MT UE and the second MT UE;
   determining, based on the first establishment cause in the first RRC Connection Request message and the second establishment cause in the second RRC Connection Request message, that the voice call corresponding to the first RRC Connection Request message has a higher priority than the second RRC Connection Request messages; and
   sending, by the terminating base station to the first MT UE in response to the first RRC Connection Request message having the higher priority, an RRC Connection Setup message to the first MT UE.

7. The method of claim 6, further comprising:
   establishing the connection for the voice call between the terminating base station and the first MT UE in response to the RRC Connection Setup message; and using the connection to transmit data for the voice call between the first MT UE and the MO UE.

8. The method of claim 7, wherein the wherein the MO UE established a separate connection with the originating base station for the voice call using another RRC Connection Request message that included another establishment cause indicating that the MO UE requested the separate connection with the originating base station for the voice call, wherein the originating base station and the terminating base station are the same base station or different base stations.

9. The method of claim 6, wherein the indication is from a Mobility Management Entity (MME) of a core network.

10. The method of claim 6, wherein the base station is an eNode B of an LTE network.

11. The method of claim 6, wherein the terminating base station has a prioritized list indicating that an establishment cause associated with an MT voice call has a higher priority than another establishment cause associated with general MT access and that an establishment cause associated with emergency MT access has a higher priority than the establishment cause associated with the MT voice call.

12. A mobile terminating (MT) user equipment (UE), comprising: one or more processors; a radio interface; and memory storing computer-executable instructions that, when executed by the one or more processors, cause the one or more processors to perform operations comprising:
   receiving, from a first base station via the radio interface, while the MT UE is in a Radio Resource Control (RRC) idle mode, an aggregated paging message that includes a header field that includes a page reason indicator indicating that the MT UE is being paged for a voice call and a unique identifier of the MT UE that is separate and distinct from the page reason indicator, the aggregated paging message is associated with paging at least one other MT UE,
   wherein the voice call is from a mobile originating (MO) UE and is prioritized by an originating base station connected to the MO UE higher than non-voice communications, the first base station different than the originating base station;
   determining that the aggregated paging message includes the unique identifier for the MT UE;
   at least partially in response to determining that the aggregated page message includes the unique identifier of the MT UE, sending, to the first base station via the radio interface, a RRC Connection Request message including a value in an establishment cause field, the value indicating to the base station that a connection with the base station is being requested for the voice call;
   receiving from the first base station, an RRC Connection Setup message in response to the value having a higher priority than a value in an RRC Connection Request from the at least one other MT UE, wherein the first base station does not have sufficient resources to establish new connections for both the MT UE and the at least one other MT UE.

13. The MT UE of claim 12, wherein the operations further comprise:
   establishing; via the radio interface, the connection with the base station in response to the RRC Connection Setup message; and using the connection, via the radio interface, to participate in the voice cell with the MO UE.

14. The MT UE of claim 12, wherein the MO UE established a separate connection with the originating base station for the voice call using another RRC Connection Request message that included another establishment cause indicating that the MO UE requested the separate connection with the originating base station for the voice call, wherein the originating base station is the base station or another base station.

15. The method of claim 1, wherein the page reason indicator is a bit or flag included in the aggregated paging message.

16. The method of claim 6, wherein the page reason indicator is a bit or flag included in the paging message and the paging message also includes a unique identifier of the MT UE that is separate and distinct from the page reason indicator.

17. The MT UE of claim 12, wherein the page reason indicator is a bit or flag included in the aggregated paging message.

18. The MT UE of claim 12, wherein the RRC message is in the 3GPP TS 36.311 protocol.

19. The MT UE of claim 12, wherein the unique identifier of the MT UE is an International Mobile Subscriber Identity (IMSI) number associated with the MT UE.

20. The method of claim 6, wherein determination the terminating base station does not have sufficient resources includes determining that the terminating base station has a congestion condition.

* * * * *